(12) United States Patent
Kori

(10) Patent No.: US 6,859,536 B1
(45) Date of Patent: Feb. 22, 2005

(54) VIDEO-SIGNAL OUTPUT APPARATUS AND VIDEO-SIGNAL INPUT APPARATUS

(75) Inventor: Teruhiko Kori, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/568,266

(22) Filed: May 10, 2000

(30) Foreign Application Priority Data

May 14, 1999 (JP) .......................................... P11-134422

(51) Int. Cl.⁷ ................................................ H04N 7/16
(52) U.S. Cl. ........................ 380/214; 380/215; 348/630
(58) Field of Search ................................ 380/214, 215; 348/630

(56) References Cited

U.S. PATENT DOCUMENTS

| | | | |
|---|---|---|---|
| 4,594,609 A | * 6/1986 | Romao et al. | 380/218 |
| 4,620,224 A | * 10/1986 | Lee et al. | 380/214 |
| 4,747,138 A | * 5/1988 | Marie et al. | 380/215 |
| 5,579,390 A | 11/1996 | Ryan et al. | |
| 2001/0038422 A1 | * 11/2001 | Yamada et al. | 348/478 |

FOREIGN PATENT DOCUMENTS

| | | | | |
|---|---|---|---|---|
| EP | 0123422 | * | 10/1984 | ............ H04N/7/16 |
| EP | 0 123 505 A1 | | 10/1984 | |
| GB | 21144298 A | * | 2/1985 | ............ H04N/7/16 |
| JP | 62-266992 A | | 11/1987 | |

* cited by examiner

*Primary Examiner*—Ayaz Sheikh
*Assistant Examiner*—Taghi T. Arani
(74) *Attorney, Agent, or Firm*—Lerner, David, Littenberg, Krumholz & Mentlik, LLP

(57) ABSTRACT

A video-signal output apparatus performs scrambling, and a video-signal input apparatus performs descrambling. The scrambling and the descrambling are performed so that signal lines are shifted for each period corresponding to one horizontal scanning interval of analog component video signals which corresponds to a horizontal scanning period or for each period which is n times one horizontal scanning period (where n represents a natural number not less than 2). The signal lines are also shifted with timing in a horizontal blanking period of the analog component video signals. When authorization is established as a result of mutual communication between the output apparatus and the input apparatus, scramble and descramble patterns each are determined based on mutually obtained information in the mutual communication.

28 Claims, 8 Drawing Sheets

VIDEO-SIGNAL OUTPUT APPARATUS AND VIDEO-SIGNAL INPUT APPARATUS

BACKGROUND OF THE INVENTION

The present invention relates to video-signal output apparatuses and video-signal input apparatuses, and in particular, to a video-signal output apparatus having a function of scrambling a video signal and outputting the signal, and a video-signal input apparatus having a function of descrambling an input scrambled video signal.

In recent years, various types of so-called "high definition (HD)" systems have become known in which image quality is enhanced by using a greater number of scanning lines than that used in a conventional television system or employing a noninterlaced (progressive scanning) method. The various types of HD systems include, for example, a system called "720P (progressive)" that uses 720 scanning lines to perform progressive scanning, a system called "1080I (interlaced)", and other proposed systems. A conventional television system such as the NTSC system ("525I") is called a "standard definition (SD)" system.

A picture displayed by the HD system has an image quality higher than that displayed by the SD system, even if the picture is composed of analog video signals. Accordingly, it is greatly demanded by suppliers of video software such as movies that copy rights be protected, by scrambling the video software broadcasted using the HD system so that viewers cannot record the software. It is also demanded that when video software is recorded for sale on media such as disks and tapes, the video software cannot be copied, by providing a scramble function to a player apparatus.

For viewing a picture which is scrambled as described above and output from an output apparatus such as a broadcast receiver or a player apparatus, a viewer may prepare, for example, a monitor, or the like, which has a descramble function adapted for interpreting the scrambling.

Accordingly, provision of the function of scrambling video signals from a video source in accordance with the HD system to the output apparatus such as the broadcast receiver or the player apparatus is considered.

A plurality of methods of scrambling video signals have been proposed. For example, one of the methods is that the polarity of video signals is switched with predetermined timing in an effective screen interval of the video signals. This method has a problem in that when scrambled video signals are descrambled, it is difficult to completely restore the signals to the state before the signals are scrambled. Therefore, a picture obtained after the video signals are descrambled is inferior to a picture obtained before the video signals are scrambled.

In connection with this method, another method has been proposed in which predetermined processing is used to perform scrambling in, for example, units of fields or units of frames of video signals. One feature of this method is that a possibility of a flicker occurring in a picture obtained after descrambling is increased due to a variation in the gain of an output amplifier in a scramble processing system or an input amplifier in a descramble processing system.

By way of example, since a picture obtained by the HD, system has an image quality higher than that obtained by the SD system, phenomena such as the above-described image-quality deterioration and flicker may cause the resulting image quality to be below an image quality demanded by viewers.

In addition, already known circuit arrangements for scramble processing are, in general, complicated, and therefore increase the manufacturing cost.

SUMMARY OF THE INVENTION

Accordingly, in view of the foregoing problems, it is an object of the present invention to provide a video-signal output apparatus and a video-signal input apparatus in which low-cost simplified circuit construction is used to perform scrambling and descrambling and in which the image quality of a descrambled picture is maintained at a high level by eliminating image-quality deterioration in the image processing.

To this end, according to an aspect of the present invention, the foregoing object is achieved through provision of a video-signal output apparatus for outputting analog component video signals via a plurality of video-signal lines corresponding to types of video signals forming the analog component video signals. The video-signal output apparatus includes: a signal-line switching unit for performing signal-line switching so that among the plurality of video-signal lines, at least two video-signal lines are shifted; a signal-line-shifting-pattern generating unit for generating a video-signal-line shifting pattern by executing processing based on predetermined algorithms; and a signal-line-switching control unit for controlling the signal-line switching unit so that video-signal-line shifting based on the video-signal-line shifting pattern is performed in accordance with a lapse of time for each period corresponding to one horizontal scanning interval of the analog component video signals or for each period which is n (where n represents a natural number not less than 2) times one horizontal scanning interval.

Preferably, the signal-line-switching control unit controls the signal-line switching unit to execute the shifting of the video-signal lines with timing in a horizontal blanking period of the analog component video signals.

The video-signal output apparatus may include a communication unit for mutually communicating with a video-signal input apparatus to which the analog component video signals output from the video-signal output apparatus are input, and the signal-line-shifting-pattern generating unit may determine the video-signal-line shifting pattern by using communication information obtained by performing bidirectional communication with the video-signal input apparatus.

The communication information may be superimposed on the analog component video signals in a predetermined interval thereof, and the analog component video signals on which the communication information is superimposed may be used for performing at least communication from the video-signal output apparatus to the video-signal input apparatus in the mutual communication between the video-signal output apparatus and the video-signal input apparatus.

According to another aspect of the present invention, the foregoing object is achieved through provision of a video-signal input apparatus to which analog component video signals are externally input from a plurality of video-signal lines corresponding to types of video signals forming the analog component video signals. The video-signal input apparatus includes: a signal-line switching unit for performing signal-line switching so that among the plurality of video-signal lines, at least two video-signal lines are shifted; a signal-line-shifting-pattern generating unit for generating a video-signal-line shifting pattern by executing processing based on predetermined algorithms; and a signal-line-switching control unit for controlling the signal-line switching unit so that video-signal-line shifting based on the video-signal-line shifting pattern is performed in accordance with a lapse of time for each period corresponding to one horizontal scanning interval of the analog component video signals or for each period which is n (where n represents a natural number not less than 2) times one horizontal scanning interval.

Preferably, the signal-line-switching control unit controls the signal-line switching unit to execute the shifting of the video-signal lines with timing in a horizontal blanking period of the analog component video signals.

The video-signal input apparatus may include a communication unit for mutually communicating with a video-signal output apparatus from which the analog component video signals input to the video-signal input apparatus are output, and the signal-line-shifting-pattern generating unit may determine the video-signal-line shifting pattern by using communication information obtained by performing bidirectional communication with the video-signal output apparatus.

The communication information may be superimposed on the analog component video signals in a predetermined interval thereof, and the analog component video signals on which the communication information is superimposed may be used for performing at least communication from the video-signal input apparatus to the video-signal output apparatus in the mutual communication between the video-signal input apparatus and the video-signal output apparatus.

According to the present invention, no flicker occurs in a restored picture, unlike the case where scrambling and descrambling are performed in units of fields or frames.

According to the present invention, a waveform in an effective screen interval in a horizontal scanning period is not affected by scrambling and descrambling. Therefore, the present invention prevents image quality obtained after scrambling from deteriorating.

According to the present invention, for cases where a scramble system is converted between an output apparatus and an input apparatus or in a wrong input apparatus, sufficient security is maintained by the determination of scramble and descramble patterns. The output apparatus can perform authorization processing which determines whether a wrong input apparatus is used, whereby security is enhanced in this respect.

According to the present invention, the need for providing a separate control line for communication is eliminated, thereby enabling low-cost simplified construction.

DETAILED DESCRIPTION

With reference to the accompanying drawings, embodiments of the present invention are described below in the following order:
1. Examples of System;
2. Examples of Output Apparatus:
  2-1. Set-Top Box; and
  2-2. DVD Player;
3. Concept of Scrambling;
4. Scrambler Unit;
5. Descrambler Unit; and
6. Example of the Processing Operation in Scramble Mode.
  1. Examples of System With reference to FIGS. 1A to 1H, audiovisual (AV) systems according to embodiments of the present invention are described below. For brevity of description, it is assumed that an output apparatus for outputting a video signal to the exterior, and an input apparatus to which the video signal output from the output apparatus is input, constitute each AV system.

It is also assumed that each of the apparatuses constituting each AV system can process a video signal adapted for at least one type of HD system. Accordingly, an actual set of output and input apparatuses may be adapted for a plurality of different HD systems and further for a predetermined SD system.

In the embodiments, when a video signal to be output is in accordance with the HD system, the output apparatus outputs a scrambled video signal, and the input apparatus descrambles the input video signal when it is in accordance with the HD system.

In other words, in the systems according to the embodiments, a video signal to be scrambled is in accordance with the HD system. A video signal in accordance with the SD system is not scrambled.

Figure 1A:
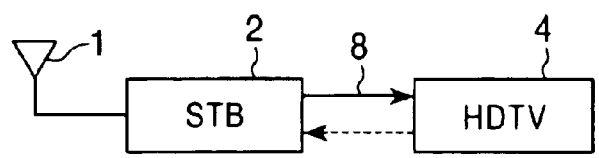
FIGS. 1A to 1H are block diagrams showing audio visual systems according to embodiments of the present invention.

The system shown in FIG. 1A includes a set-top box (STB) 2 as an output apparatus. The STB 2 is an integrated tuner unit for receiving, for example, a broadcast in accordance with a predetermined HD system. As shown in FIG. 1A, when the broadcast waves received by an antenna are input to the STB 2, the STB 2 performs processes such as tuning and demodulation, and outputs a finally obtained video signal from the tuned broadcasting station.

In the system shown in FIG. 1A, a video-signal line 8 that connects the output apparatus and the input apparatus allows analog component video signals (a luminance (Y) signal and color-difference (R-Y and B-Y) signals) through it, as described below. When the STB 2 outputs the analog component video signals (hereinafter referred to as the "HD analog component signals"), which are in accordance with the HD system, the STB 2 scrambles the HD analog component signal.

Practically, the STB 2 may have a construction capable of outputting a composite video signal, a digital video signal, etc.

In the system shown in FIG. 1A, an HD television receiver (hereinafter referred to as an "HDTV") 4 adapted for the same HD system as in the STB 2 and which can display a picture, is used as an input apparatus. The HDTV 4 descrambles the scrambled HD analog component signals to restore the original video signals, thereby displaying a picture.

Figure 1B:
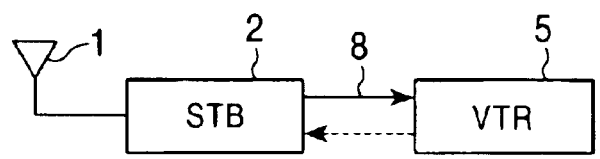

Referring to FIG. 1B, the STB 2 is used as an output apparatus, and a videotape (videocassette) recorder (VTR) 5 having a descramble function is used as an input apparatus. The VTR 5 can descramble scrambled HD analog component signals, and can record the descrambled signals on a videotape. Here, the type of a recording method by the VTR 5 may be analog or digital.

Figure 1C:
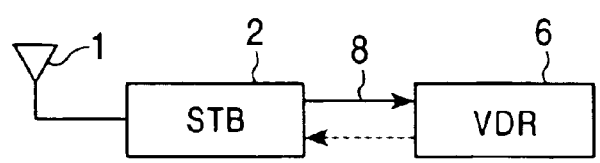

Referring to FIG. 1C, the STB 2 is used as an output apparatus, and a videodisc recorder (VDR) 6 is used as an input apparatus. The VDR 6 can record on or read from a predetermined recordable disk recording medium. The VDR 6 can descramble input scrambled HD analog component signals, and can record the descrambled signals on the recording medium.

Figure 1D:
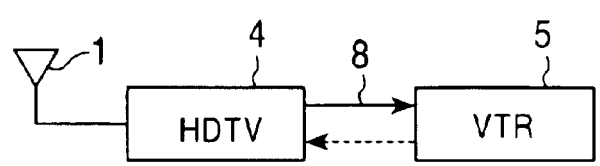

Referring to FIG. 1D, the HDTV 4 is used as an output apparatus, and the VTR 5 is used as an input apparatus.

In the construction shown in FIG. 1D, a tuned digital broadcast received by an antenna 1 can be displayed on the HDTV 4.

Figure 1E:
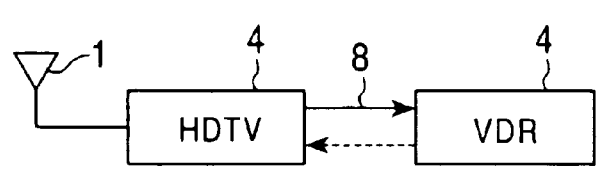

Referring to FIG. 1E, the HDTV 4 is used as an output apparatus, and the VDR 6 is used as an input apparatus.

Figure 1F:
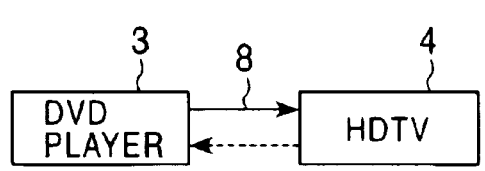

Referring to FIG. 1F, a digital versatile disk (DVD) player 3 is used as an output apparatus, and the HDTV 4 is used as an input apparatus. When video signals of a moving picture recorded on a DVD played by the DVD player 3 are in accordance with the HD system, the DVD player 3 can output the signals as scrambled HD analog component signals.

Figure 1G:
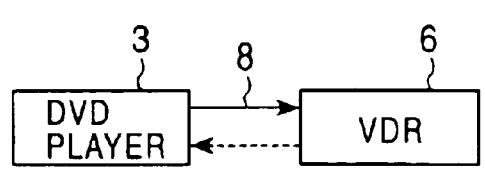

Referring to FIG. 1G. the DVD player 3 is used as an output apparatus, and the VDR 6 is used as an input apparatus.

Figure 1H:
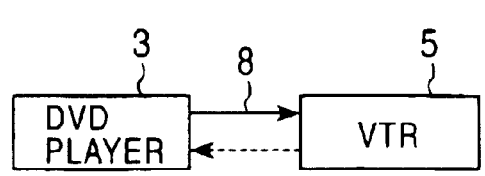

Referring to FIG. 1H, the DVD player 3 is used as an output apparatus, and the VTR 5 is used as an input apparatus.

In this construction, scrambled HD analog component signals, output from the DVD player 3, are input to the VTR 5, and the VTR 5 can descramble the input signals and can record the descrambled signals on the tape.

Regarding examples of AV systems according to the present invention, embodiments other than those shown in FIGS. 1A to 1H are possible.

2. Examples of Output Apparatus

2–1. Set-Top Box

Among the output apparatuses in the above-described AV systems, the STB 2 and the DVD player 3, as typical apparatuses, are described below with regard to their internal structures.

Figure 2:
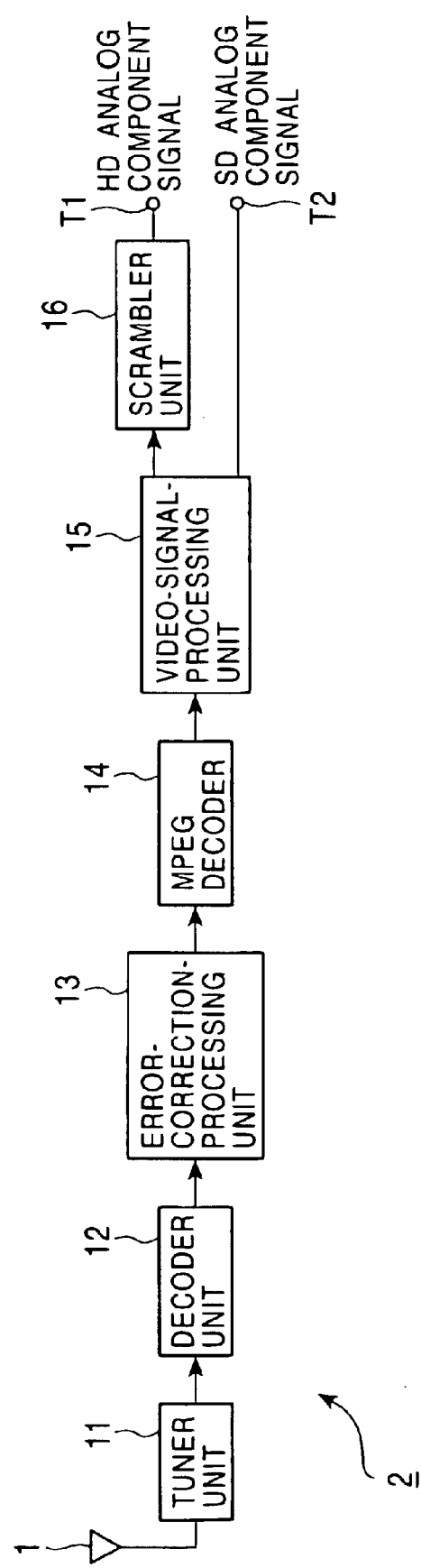
FIG. 2 is a block diagram showing a set-top box 2 in embodiments of the present invention.

First, the STB 2 is described with reference to FIG. 2.

The STB 2 includes a tuner unit 11 that performs tuning when broadcast waves received by an antenna 1 are input. The broadcast waves from a broadcast station tuned by the tuner unit 11 are supplied to a demodulating unit 12. The demodulating unit 12 extracts stream data by performing demodulation. An error-correction-processing unit 13 performs error correction in accordance with a predetermined method, and supplies the error-corrected data to a moving-picture-experts-group (MPEG) decoder 14.

In the stream data, which are carried by the broadcast waves, image information is compressed by the MPEG method. The MPEG decoder 14 outputs video-signal data obtained by decompression in accordance with the MPEG method.

The video-signal data, output from the MPEG decoder 14, are supplied to a video-signal-processing unit 15. The video-signal-processing unit 15 implements the various types of signal processing required depending on, for example, the type of television system. The video-signal-processing unit 15 can output an analog video signal obtained by converting the video-signal data. For example, when the video-signal data are converted into an HD analog component signal, the signal is output from an output terminal T1 via a scrambler unit 16. When the video-signal data are converted into an SD analog component signal, the signal is output from an output terminal T2.

The scrambler unit 16 is provided after the video-signal-processing unit 15. This arrangement is described below.

2-2. DVD Player

Figure 3:
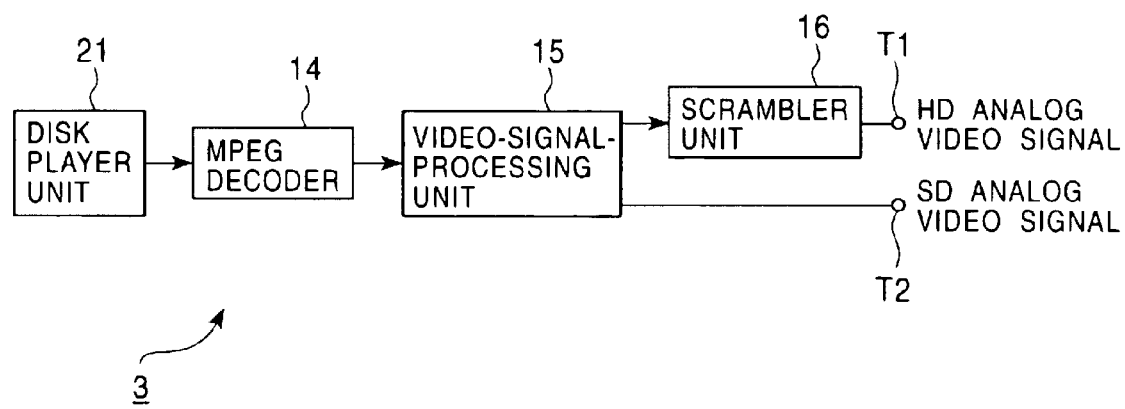
FIG. 3 is a block diagram showing a digital versatile disk player.

The internal structure of the DVD player 3 is briefly described with reference to FIG. 3. In FIG. 3, functional circuit units which have functions identical or similar to those in FIG. 2 are identified by identical reference numerals.

Referring to FIG. 3, a disk player unit 21 in the DVD player 3 reads data from a DVD. Here, video-signal data, recorded on the DVD, are compressed in the MPEG method. Accordingly, the read data are decompressed by an MPEG decoder 14, and the decompressed data are supplied to a video-signal-processing unit 15.

The video-signal-processing unit 15 executes various types of processing required depending on, for example, the type of television system. When the data are converted into HD analog component signals, the signals are output from an external terminal T1 via a scrambler unit 16. When the data are converted into SD analog component signals, the signals are output from an output terminal T2.

3. Concept of Scrambling

With reference to FIGS. 6A to 8, scrambling in the embodiments is conceptually described.

In the embodiments, scrambling is performed as shown in FIGS. 6A to 6C.

The HD analog component signals include three component signals, namely, a luminance (Y) signal and color-difference (R-Y and B-Y) signals. The R-Y signal and the B-Y signal are shifted with timing in one horizontal scanning interval, as shown in FIGS. 6B and 6C. Here, timing in a horizontal synchronizing interval (horizontal blanking period) is used as the timing with which the R-Y signal and the B-Y signal are shifted.

If the HD analog component signal, in which the R-Y signal and the B-Y signal are shifted as described above, is input to an input apparatus without being changed, and the input apparatus performs processing such as displaying or recording, displaying or playing in an appropriate image state is not performed. In other words, a scrambled HD analog component signal is obtained.

The shifting of the R-Y signal and the B-Y signal is performed with timing in a horizontal synchronizing interval in one horizontal scanning period. Accordingly, in order to perform descrambling in accordance with the scrambling result, the R-Y signal and the B-Y signal are also shifted with timing in a horizontal synchronizing interval in one horizontal scanning period.

In the embodiments, by shifting the signals in a short interval of one horizontal scanning period, flickers can be prevented from occurring, compared with the case where signal shifting is performed in units of fields or frame periods. By performing scrambling or descrambling so that the signals are shifted with timing in the horizontal synchronizing interval, the video signals between horizontal synchronizing intervals are not affected by a waveform change due to the signal shifting. In other words, the picture quality obtained after scrambling is not inferior compared to the picture quality obtained before scrambling.

In the description referring to FIGS. 6A to 6C, each signal shifting interval is one horizontal scanning interval unit. However, according to the present invention, each signal shifting interval may be, for example, two or more horizontal scanning interval units.

Figure 6:
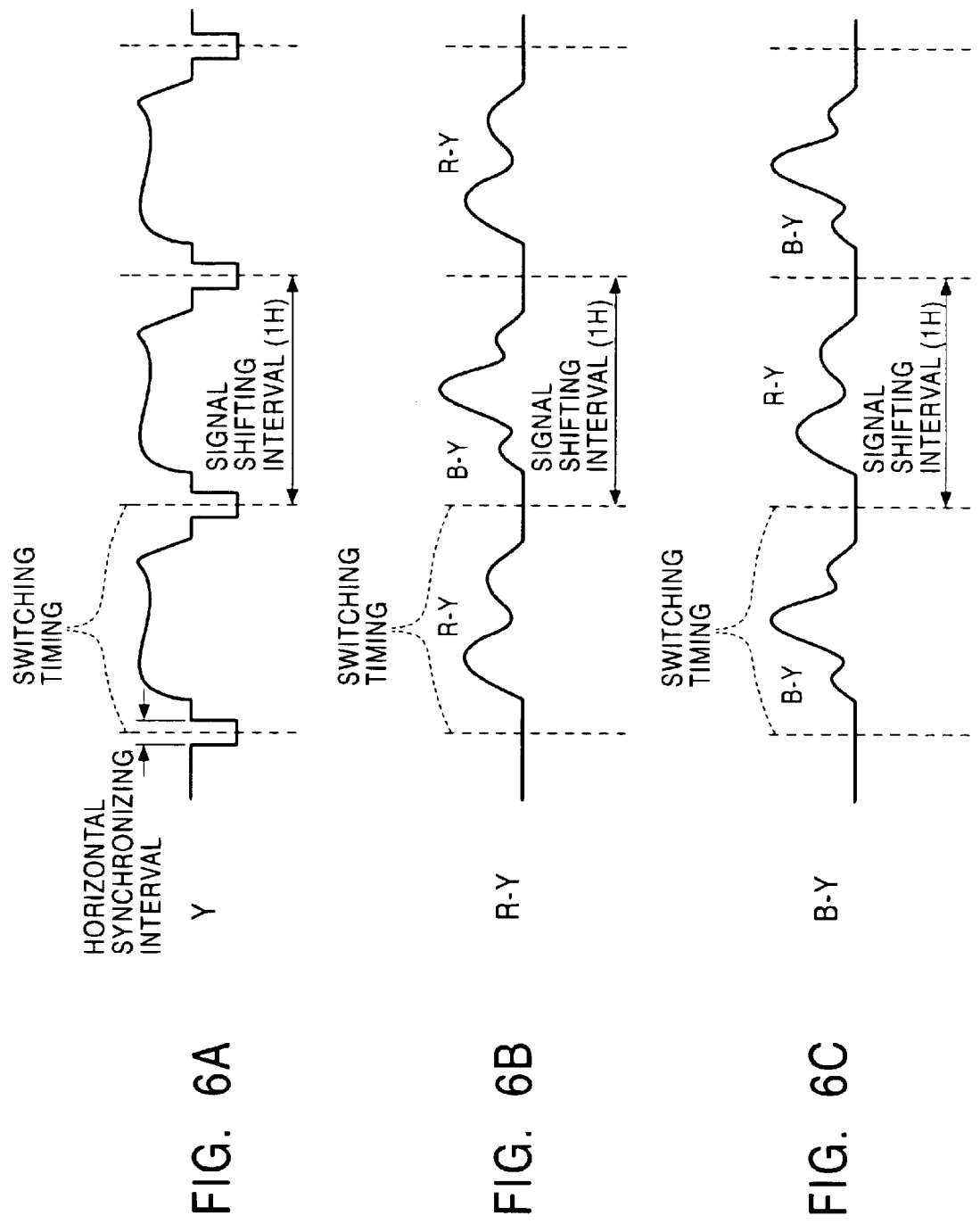
FIGS. 6A to 6C are waveform charts showing forms of scrambling in a horizontal scanning interval according to embodiments of the present invention.
Figure 7:
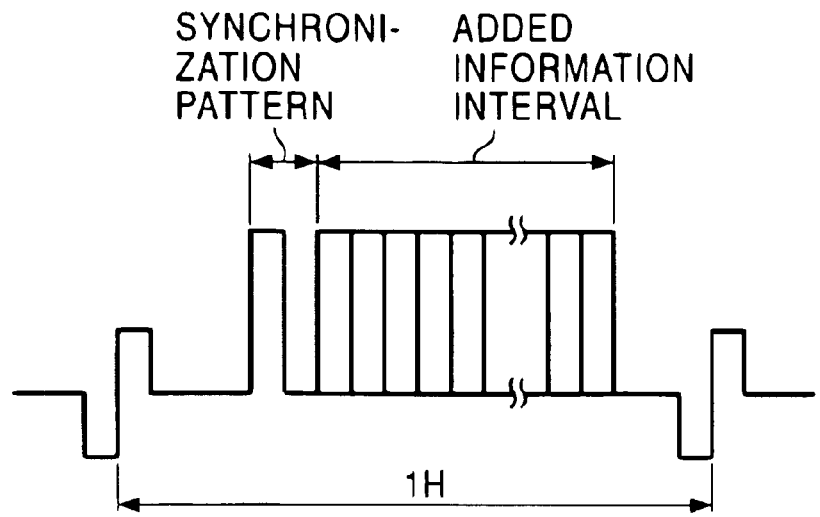
FIG. 7 is a waveform chart showing the insertion of added information in a video signal.
Figure 8:
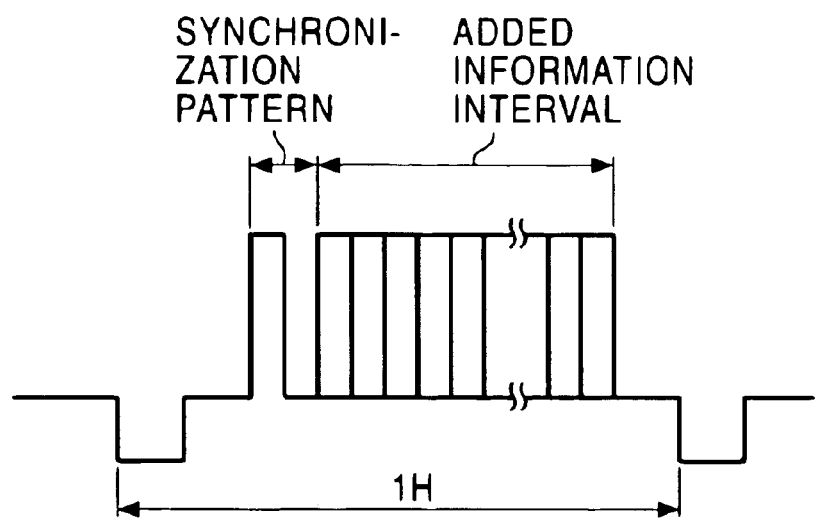
FIG. 8 is a waveform chart showing the insertion of added information in a video signal.

The position at which added information is inserted in the vertical blanking interval shown in FIGS. 6A to 6C is shown enlarged in FIGS. 7 and 8.

FIG. 7 shows a waveform in one predetermined horizontal scanning interval in the vertical blanking interval, which is adapted for systems such as the "720P" and the "1080I". These systems have three levels in the horizontal synchronizing interval.

The added information needs a synchronization pattern provided before it which corresponds to the one horizontal scanning interval. A waveform that varies with actual data is provided as the added information.

FIG. 8 shows a waveform in one predetermined horizontal scanning interval in a vertical blanking interval, which is adapted for systems such as the "525P" and the "525I". The systems, such as the "525P" and the "525I", differ from the waveform shown in FIG. 7 in that the systems have two levels in the horizontal synchronizing interval.

Also, in the horizontal scanning interval, a synchronization pattern is needed before the added information. A waveform that varies with actual data is provided as the added information.

In actuality, there is no particular limitation on which of the horizontal scanning intervals in the vertical blanking interval is used for the superimposition of the added information. The superimposition may be performed in accordance with an actually defined standard or the like.

4. Scrambler Unit

Figure 4:
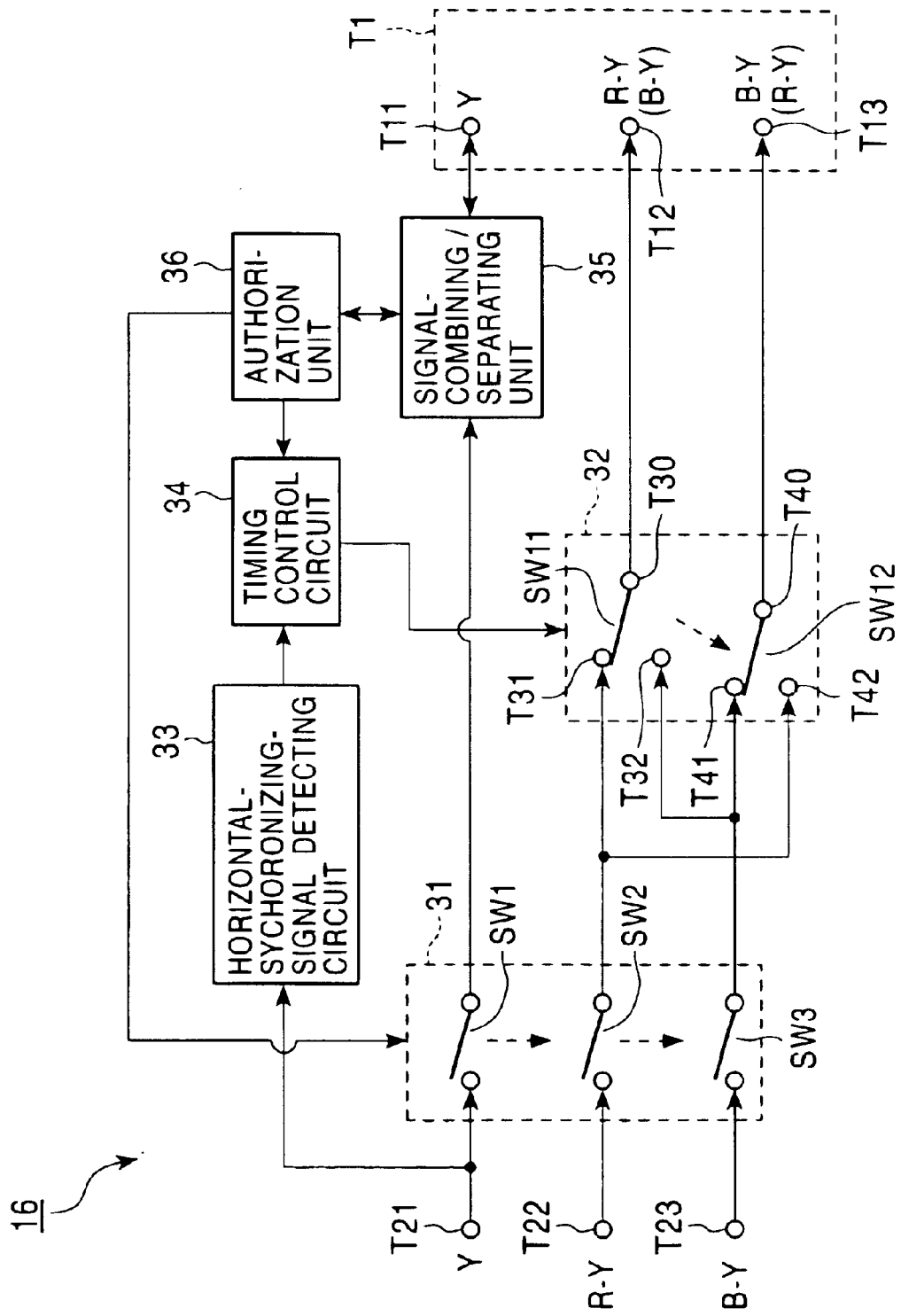
FIG. 4 is a block diagram showing a scrambler unit 16 in embodiments of the present invention.
Figure 5:
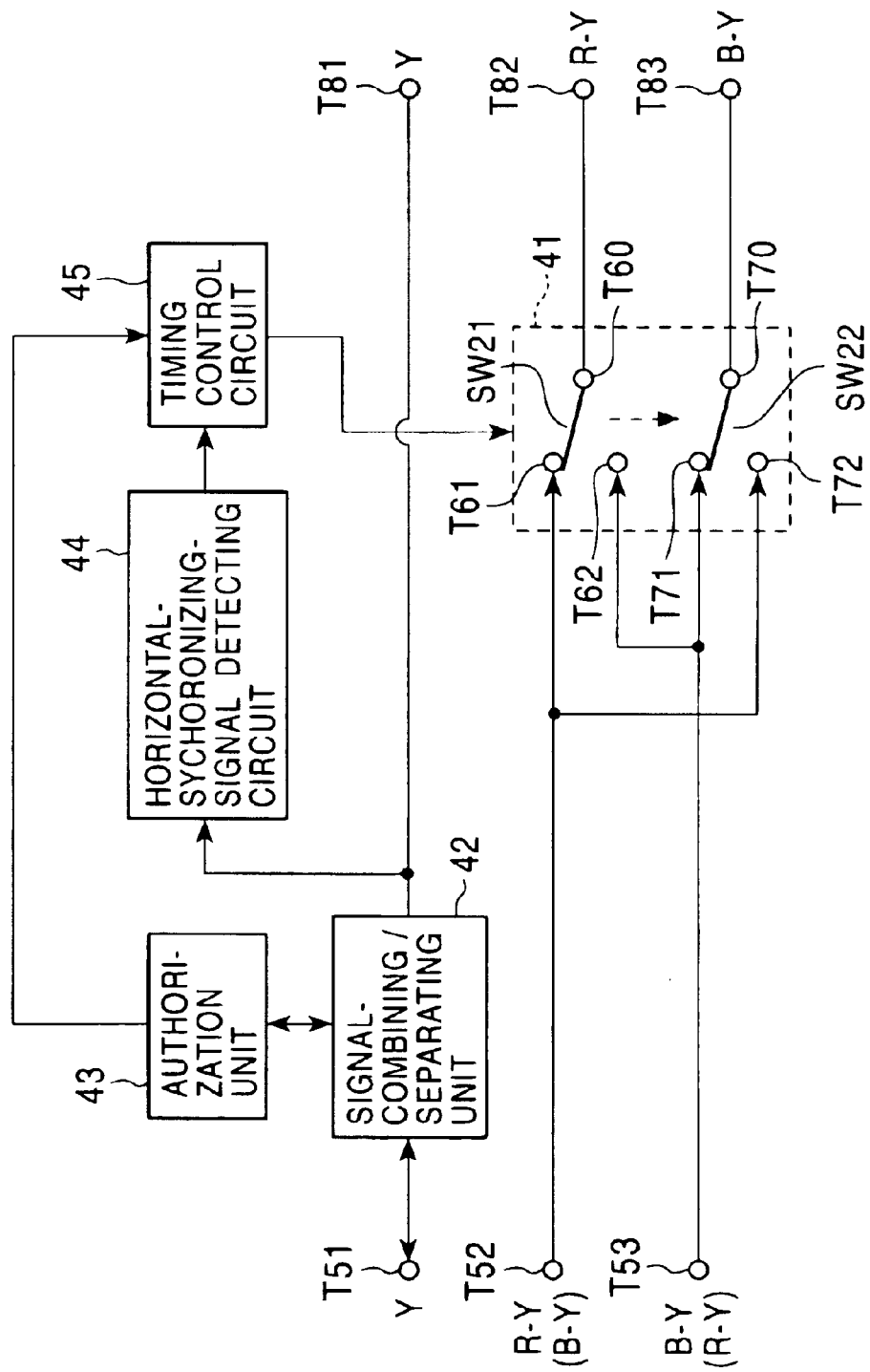
FIG. 5 is a block diagram showing a descrambler unit in embodiments of the present invention.

The construction of a scrambler unit 16 for the embodiments is described below with reference to FIG. 4. The construction shown in FIG. 4 is provided in an output channel for the HD analog component signal from each of the output apparatuses shown in FIG. 1. If the output apparatus is the STB 2 or the DVD player 3, the construction corresponds to the scrambler unit 16 shown in FIG. 2 or 3.

HD analog component signals are supplied from, for example, the video-signal-processing unit 15 at the previous stage to the scrambler unit 16 shown in FIG. 4. Among the HD analog component signals, the Y signal is supplied to a Y input terminal T21, the R-Y signal is supplied to an R-Y input terminal T22, and the B-Y signal is supplied to a B-Y terminal T23. The Y signal is also supplied to a horizontal-synchronizing-signal detecting circuit 33.

The input terminals T21, T22, and T23 are connected to switches SW1, SW2, and SW3 in a switching unit 31, respectively.

In the switching unit 31, the switches SW1, SW2, and SW3 operate mutually to be simultaneously turned on and off. The switching operation of the switching unit 31 is controlled by an authorization unit 36.

The Y signal from the switch SW1 is input to a signal-combining/separating unit 35.

At this time, the output apparatus and the input apparatus communicate with each other in order to determine an algorithm for m scramble patterns, as described below. For the communication, in the output apparatus, communication information is inserted in a predetermined horizontal interval in a vertical blanking interval of the Y signal, as described above with reference to FIGS. 7 and 8.

The signal-combining/separating unit 35 combines the communication information generated and output by the authorization unit 36 with the Y signal. The signal-combining/separating unit 35 outputs the Y signal, on which the communication information is superimposed, to the input apparatus via an output terminal T11.

The Y output terminal T11, and an R-Y output terminal T12 for the R-Y signal and a B-Y output terminal T13, which are described later, are parts of the terminal T1 shown in FIG. 2 or 3.

From the output apparatus to the input apparatus via the terminal T11, the communication information is sent with timing in a predetermined horizontal scanning interval in a vertical blanking interval of the Y signal. The signal-combining/separating unit 35 separates, from the Y signal, the communication information sent from the input apparatus, and outputs the separated Y signal to the authorization unit 36.

The R-Y signal from the switch SW2 is split so as to be supplied to a terminal T31 of a switch SW11 in a switching unit 32 and to a terminal T42 of a switch SW12 in the switching unit 32.

The B-Y signal from the switch SW3 is split so as to be supplied to a terminal T32 of a switch SW11 in the switching unit 32 and to a terminal T41 of a switch SW12 in the switching unit 32.

The switching unit 32 includes the switch SW11 to which the R-Y signal is input and the switch SW12 to which the B-Y signal is input. The switches SW11 and SW12 operate mutually to be simultaneously switched. For example, when a terminal T30 and the terminal T31 are connected by the switch SW11, a terminal T40 and the terminal T41 are connected by the switch SW12. When the switch SW11 is switched so that the terminal T30 and the terminal T32 are connected, the switch SW12 is simultaneously switched so that the terminal T40 and the terminal T42 are connected.

The terminal T30, which is the output of the switch SW11, is connected to the R-Y output terminal T12. The terminal T40, which is the output of the switch SW12, is connected to the B-Y output terminal T13.

When the switching unit 31 (switches SW1, SW2, and SW3) is turned on, the terminals T30 and T31 are connected by the switch SW11, and the terminals T40 and T41 are connected by the switch SW12, the R-Y signal input from the terminal T22 is output from the R-Y output terminal T12, and the B-Y signal input from the terminal T23 is output from the B-Y output terminal T13. In other words, the R-Y signal and the B-Y signal are normally output.

When the terminals T30 and T32 are connected by the switch SW11, and the terminals T40 and T42 are connected by the switch SW12, the R-Y signal input from the terminal T22 is output from the B-Y output terminal T13, and the B-Y signal input from the terminal T23 is output from the R-Y output terminal T12.

In other words, regarding the HD analog component signals to be output from the terminal T1, the R-Y and B-Y signal lines are shifted.

The horizontal-synchronizing-signal detecting circuit 33 detects a horizontal synchronizing signal from the input Y signal, and supplies the detected signal to the timing control circuit 34 with the detection timing.

Based on the detection timing of the horizontal synchronizing signal, which is input from the horizontal-synchronizing-signal detecting circuit 33, and on a scramble pattern generated by the authorization unit 36 (described below), the timing control circuit 34 executes, in units of horizontal scanning intervals, control of the switching of the switches SW11 and SW12 in the switching unit 32 in accordance with the scramble pattern by using a horizontal synchronizing interval as the switching timing, as described with reference, to FIG. 6. This shifts the R-Y signal and the B-Y signal in accordance with the scramble pattern generated by the authorization unit 36. In other words, the HD analog component signals are scrambled.

The authorization unit 36 actually includes, for example, a microcomputer or the like, whereby the unit 36 executes various processes, and generates the scramble pattern, as described below. When the authorization unit 36 communicates with the input apparatus and obtains no authorization result, it controls the switch 31 to turn off the switches SW1, SW2, and SW3. In other words, when the authorization unit 36 determines that the input apparatus has no decoding function adapted for interpreting the scrambling in the embodiments, it terminates the outputting of the HD analog component signals.

The operation of the authorization unit 36 is described later.

5. Descrambler Unit

The structure of the Descrambler unit in the input apparatus in each of the embodiments is described below with reference to FIG. S. The Descrambler unit is provided at the HD analog component signal input stage in each of the input apparatuses shown in FIG. 1.

Among the HD analog component signals input from the output apparatus, the Y signal is supplied to a Y input terminal T51, the R-Y signal is supplied to an R-Y input terminal T52, and the B-Y signal is supplied to a B-Y input terminal T53.

The Y signal supplied to the Y input terminal T51 is supplied to a signal-combining/separating unit 42.

The signal-combining/separating unit 42 has a construction similar to that of the signal-combining/separating unit 35. The signal-combining/separating unit 42 separates communication information (as the added information) superimposed on the Y signal supplied from the output apparatus, and supplies the information to an authorization unit 43. The signal-combining/separating unit 42 also transmits communication information output from the authorization unit 43 to the output apparatus via a channel for the Y signal by using, for example, a predetermined horizontal scanning interval in a vertical blanking interval.

The Y signal from which the communication information from the output apparatus is separated by the signal-combining/separating unit 42 is supplied to a Y output terminal T81. The Y signal from the signal-combining/separating unit 42 is split and also supplied to a horizontal-synchronizing-signal detecting circuit 44.

The R-Y signal, input to an R-Y input terminal T52, is split so as to be supplied to a terminal T61 of a switch SW21 in a switching unit 41 and to a terminal T72 of a switch SW22 in the switching unit 41.

The B-Y signal, input to a B-Y input terminal T53, is split so as to be supplied to a terminal T62 of the switch SW22 in the switching unit 41 and to a terminal T71 of the switch SW22 in the switching unit 41.

The switching unit 41 includes the switches SW21 and SW22, from which the R-Y signal and the B-Y signal are input.

In the switch 41, the switches SW21 and SW22 operate mutually to be simultaneously switched. When the terminals T60 and T61 are connected by the switch SW21, the terminals T70 and T71 are connected by the switch SW22. When the switch SW21 is switched so that the terminals T60 and T62 are connected, the switch SW22 is simultaneously switched so that the terminals T70 and T72 are connected.

The terminal T60, which is the output of the switch SW21, is connected to an R-Y output terminal T82. The terminal T70, which is the output of the switch SW22, is connected to a B-Y output terminal T83.

When the terminals T60 and T61 are connected by the switch SW21, and the terminals T70 and T71 are connected by the switch SW22, the R-Y signal, input from the R-Y input terminal T52, is output from the R-Y output terminal 82, and the B-Y signal, input from the B-Y input terminal T53, is output from the B-Y output terminal T83. In other words, the input R-Y and B-Y signals are coincident with the output R-Y and B-Y signals.

When the terminals T60 and T62 are connected by the switch SW21, and the terminals T70 and T72 are connected by the switch SW22, the R-Y signal, which is input from the R-Y input terminal T52, is output from the B-Y output terminal T83, and the B-Y signal, which is input from the B-Y input terminal, is output from the R-Y output terminal T82. In this case, the R-Y signal line and the B-Y signal line are shifted.

The horizontal-synchronizing-signal detecting circuit 44 detects a horizontal synchronizing signal from the input Y signal, and supplies the detected signal to a timing control circuit 45 with the detection timing.

Based on the detection timing of the horizontal synchronizing signal, which is input from the horizontal-synchronizing-signal detecting circuit 44, and on a descramble pattern generated by an authorization unit 43 (described below), the timing control circuit 45 executes, in units of horizontal scanning intervals, control of the switching of the switches SW21 and SW22 in the switching unit 41 in accordance with the descramble pattern. This shifts the R-Y signal and the B-Y signal in accordance with the descramble pattern generated by the authorization unit 43.

The descramble pattern, generated by the operation of the authorization unit 43, corresponds to the scramble generated by the authorization unit 36 in the output apparatus, which is described above.

In other words, the switching in the switching unit 41 is controlled as described above when the scrambled analog component signals (in which the signal lines for the R-Y signal and the B-Y signal are shifted) are supplied, whereby the R-Y signal and the B-Y signal, shifted at the time of scrambling, are restored so that the signals are returned to the original lines.

Similarly to the authorization unit 36 shown in FIG. 4, the authorization unit 43 also includes a microcomputer or the like for generating the descramble pattern, as described later.

The operation of the authorization unit 43 is described below together with the operation of the authorization unit 36.

EXAMPLE OF THE PROCESSING OPERATION IN SCRAMBLE MODE

Figure 9:
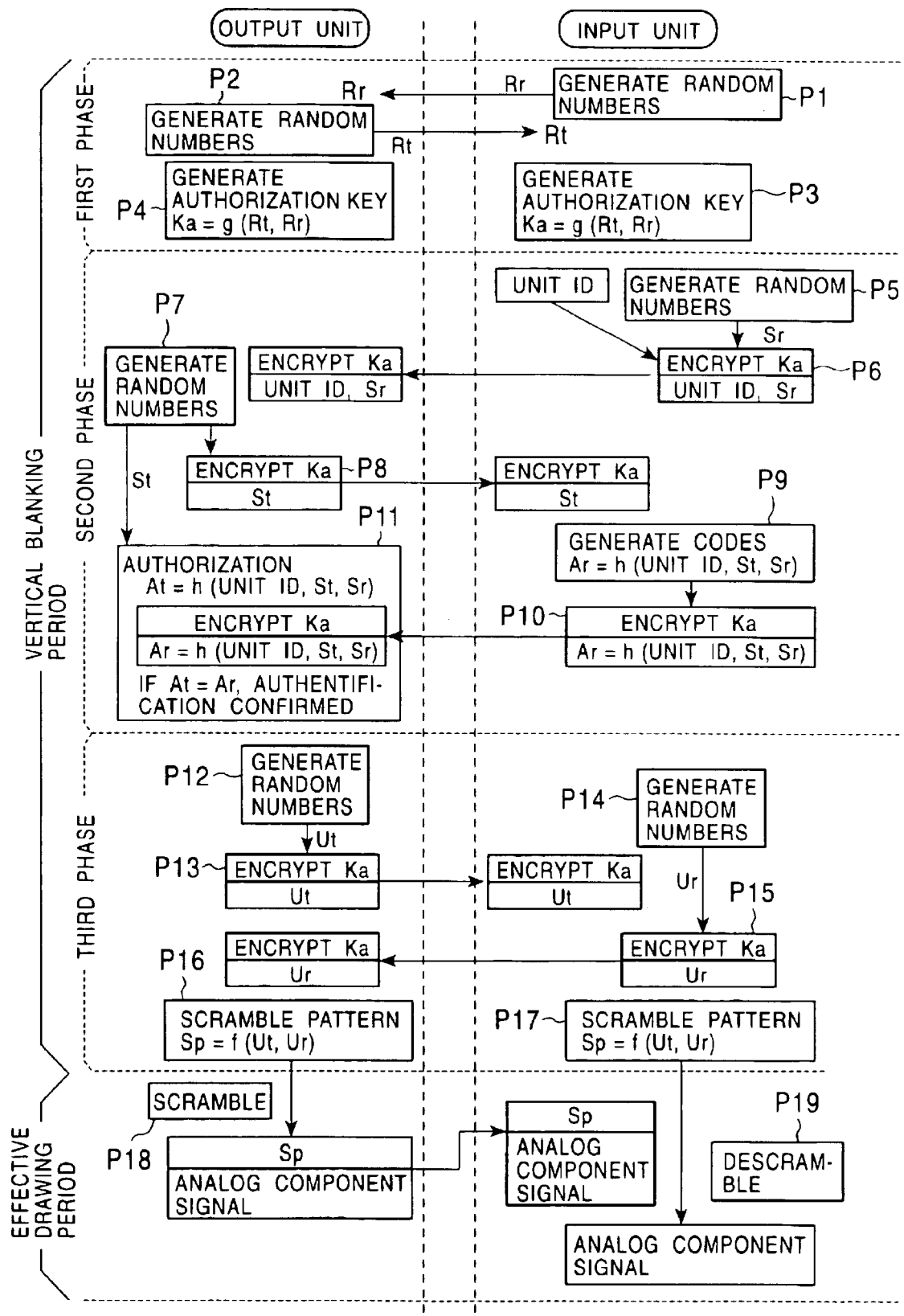
FIG. 9 is a flowchart showing a process for scrambling by an output authorization unit and a process for descrambling by an input authorization unit.

The operation of the authorization unit 36 in the output apparatus and the operation of the authorization unit 43 in the input apparatus, which are required to execute when scrambling and descrambling are performed, are shown in FIG. 9.

The authorization unit 36 in the output apparatus is hereinafter referred to as the "output authorization unit", and the authorization unit 43 in the input apparatus is hereinafter referred to as the "input authorization unit".

The process shown in FIG. 9 is an algorithm for generating the scramble pattern and the descramble pattern. The process is for one field period, and is repeatedly performed for each field period. The process is broadly divided into a process performed in a vertical blanking interval and a successive process performed in an effective screen interval.

The process in the vertical blanking interval includes a first phase, a second phase, and a third phase. Mutual communication between the output authorization unit and the input authorization unit is executed using the channel for the Y signal, as described above. In particular, when communication information is transmitted from the output authorization unit to the input authorization unit, the communication information is superimposed in a horizontal interval in the blanking period of the Y signal.

In process P1, in the first phase in the vertical blanking interval, random numbers Rr are generated and transmitted as communication information to the output authorization unit by the input authorization unit.

When the random numbers Rr are input to the output authorization unit, random numbers Rt are generated and transmitted to the input authorization unit in process P2.

When the random numbers Rt are input to the input authorization unit, the input authorization unit generates an authorization key Ka, using the input random numbers Rt and the random numbers Rr it generates in process P3.

The authorization key Ka is obtained by the following expression:

$$Ka=g(Rt, Rr) \quad (1)$$

In process P4, the output authorization unit generates an authorization key Ka, using the random numbers Rr and Rt.

The above-described flow is the first phase. In other words, in the first phase, the authorization key Ka, which is a common secret for the output authorization unit and the input authorization unit, is generated using the random numbers Rt and Rr. The authorization key Ka is used to encrypt data as communication information when communication is performed as the subsequent processes.

In the second phase, in process P5, the input authorization unit generates random numbers Sr. In process P6, a unit ID assigned to the input authorization unit beforehand, and the random numbers Sr, are encrypted using the authorization key Ka, and the encrypted information is transmitted to the output authorization unit.

At this time, in process P7, the output authorization unit generates random numbers St. In process P8, the random numbers St are encrypted using the authorization key Ka, and the encrypted information is transmitted to the input authorization unit.

When the encrypted random numbers St are input to the input authorization unit, the encryption is decoded using the authorization key Ka, whereby the real values of the random numbers St are obtained. After that, in process P9, code Ar is generated using the random numbers St, the random numbers Sr generated in process PS, and the unit ID.

The code Ar is obtained by the following expression:

$$Ar=h(\text{unit } ID, St, Sr) \quad (2)$$

Here, there is no particular limitation in the type of function for the expression.

In process P10, the input authorization unit encrypts the code Ar, and outputs the encrypted code to the output authorization unit.

When the encrypted code Ar is input to the output authorization unit, the output authorization unit decodes the input code and obtains the real value. Authorization processing, as process P11, is then executed.

In process P11, code Ar is generated using the random numbers St generated in process P7, the unit ID transmitted by process P6, and the random numbers Sr.

This code Ar is obtained by the following expression:

$$At=h(\text{unit } ID, St, Sr) \quad (3)$$

At this stage, the output authorization unit obtains the code At generated as described above and the code Ar transmitted from the input authorization unit in process P10.

Accordingly, the output authorization unit compares the code Ar and the code At.

If the determination result is that the code Ar equals the code At, authorization is established. The establishment of the authorization means that the input apparatus is a right apparatus having a descramble function adapted for the output apparatus.

Conversely, no establishment of authorization means that the input apparatus is a wrong apparatus having no descramble function adapted for the output apparatus.

In this case, for example, the authorization keys Ka in the output apparatus and the input apparatus differ from each other. Thus, in the second phase (processes P5 to P11), a problem occurs in that, for example, the encrypted information cannot be decoded. As a result, the comparison between the code At and the code Ar in process P11 results in noncoincidence.

The above-described flow is the second phase. When no establishment of the authorization is actually obtained as a result of the determination in process P11, the output authorization unit (the authorization unit 36) controls the switching unit 31 (the switches SW1, SW2, and SW3), which has been turned on, to be turned off. In other words, the outputting of the HD analog component signals to the input apparatus is stopped. The output authorization unit is controlled so as not to execute the subsequent processes.

It is possible, when authorization is not established, to output HD analog component signals that have been scrambled using a properly generated scramble pattern. Nevertheless, greater security is obtained by stopping the outputting of the HD analog component signals.

When the authorization is obtained in process P11, processes in the third phase are executed.

In the third phase, in process P12, random numbers Ut are generated by the output authorization unit. In process P13, the authorization key Ka is used to encrypt the random numbers Ut, and the encrypted random numbers Ut are transmitted to the input authorization unit.

When the random numbers Ut are input to the input authorization unit, in process P14, the input authorization unit generates random numbers Ur. In process P15, the random numbers Ur are encrypted using the authorization key Ka, and the encrypted random numbers Ur are transmitted to the output authorization unit.

When the encrypted random numbers Ur are input to the output authorization unit, process P16 is executed. In process P16, by using the encrypted random numbers Ur and the random numbers Ut generated in process P12, a scramble pattern Sp is generated by the following expression:

$$Sp=f(Ut, Ur) \quad (4)$$

In the input authorization unit, in process P17, a scramble pattern Sp is generated. For this purpose, the input; authorization unit solves the expression (4), using the random numbers Ur generated in process P14 and a real value obtained by decoding the encrypted random numbers Ut input from the output authorization unit.

The above-described third phase then ends.

As described above, the processes in the first to third phases are performed in the vertical blanking interval. As can be understood from the foregoing description, in the processing performed in the vertical blanking interval, the output authorization unit performs authorization through mutual communication between the output authorization unit and the input authorization unit, and when the authorization is obtained, the output authorization unit and the input authorization unit execute the processes up to the generation of the scramble patterns Sp.

When the third phase ends, the stage of processing in the effective screen interval in one field begins. In the output authorization unit, in process P18, processing for scrambling the HD analog component signals in accordance with the scramble pattern Sp generated in process P16 is performed.

At this time, the output authorization unit (the authorization unit 36) supplies the scramble pattern Sp to the timing control unit 34. The timing control unit 34 executes, based on the detected horizontal synchronizing signal output from the horizontal-synchronizing-signal detecting circuit 33 and on a signal-shifting pattern in accordance with the scramble pattern Sp, control of the switching in the switches SW11 and SW12 of the switching unit 31. Thereby, the signals in the effective screen interval in one field are scrambled in accordance with the scramble pattern Sp.

For the processing in the effective screen interval in one field, the input authorization unit executes descrambling in process P19.

At this time, the input authorization unit (the authorization unit 43) supplies the scramble pattern Sp to the timing control unit 45. The timing control unit 45 executes, based on the detected horizontal synchronizing signal output from the horizontal-synchronizing-signal detecting circuit 44 and on a signal-shifting pattern for descrambling in accordance with the scramble pattern Sp, control of the switching in the switches SW11 and SW12 of the switching unit 32 so that the R-Y signal and the B-Y signal are shifted with timing in the horizontal synchronizing interval. Thereby, the signals in the effective screen interval in one field are descrambled in accordance with the scramble pattern Sp.

Here, when the input apparatus is a right apparatus having a descramble function adapted for the output apparatus, the scramble pattern Sp generated by the output authorization unit and the scramble pattern Sp generated by the input authorization unit must be the same because both patterns are obtained based on the expression (function) (4). Thus, in this case, in the input authorization unit, appropriate descrambling is performed, and the original HD analog component signals are restored.

If the input authorization unit is a wrong apparatus, and some effective construction is employed in the wrong apparatus, there is still a possibility that the authorization will be established in the second phase. However, in this case, there is a high possibility that the scramble patterns Sp are not the same at the time the wrong input authorization unit is detected because the third phase uses communication with encrypted random numbers and the scramble patterns Sp are generated using a predetermined function (the expression (4)). In this case, the input authorization unit cannot perform appropriate descrambling. Therefore, only deshaped waveforms are obtained as the original HD analog component signals.

The embodiments of the present invention have been described for use with HD analog component signals. However, in the present invention, signals to be scrambled and descrambled may be, for example, SD analog component signals. In other words, the present invention may be applied to any type of television system having a plurality of video signals as analog component signals. In addition, signals that can be shifted are not limited to color-difference signals, but may be, for example, a combination of a luminance signal and color-difference signals, the selection of which is arbitrary. Moreover, a construction in which scrambling is performed with at least three signals shifted may be employed. In addition to analog component signals composed of, for example, a luminance signal and color-difference signals, the present invention may be applied to analog component signals composed of red, green, and blue signals.

What is claimed is:

1. A video-signal output apparatus for outputting analog component video signals on a plurality of output lines, each of said output lines outputting one of said component video signals, said video-signal output apparatus comprising:

a processor operable to generate a switching pattern based on a predetermined algorithm;

a switch operable for switching, based on said switching pattern, the component video signal previously outputted on a first of said output lines to a second of said output lines and the component video signal previously outputted on the second of said output lines to the first of said output lines; and a controller operable to synchronize said switching with a horizontal scanning interval of the analog component video signals.

2. A video-signal output apparatus according to claim 1, wherein said processor is adapted to determine said switching pattern based upon information obtained by performing bidirectional communication with a video-signal input apparatus receiving said analog component video signals from said output apparatus.

3. A video-signal output apparatus according to claim 2, wherein said information is superimposed on one or more of the analog component video signals in a predetermined interval thereof.

4. A video-signal output apparatus according to claim 1, wherein said controller controls said switch to execute the switching in response to timing information transmitted to said controller in a horizontal blanking period of the analog component video signals.

5. A video-signal output apparatus as in claim 1, wherein said controller is operable to synchronize said switching in response to a natural-number multiple of said horizontal scanning interval.

6. A video-signal output apparatus as in claim 1, wherein said analog component video signals comprise a luminance signal and two color-difference signals.

7. A video-signal output apparatus as in claim 1, wherein said analog component video signals comprise a red signal, a green signal and a blue signal.

8. A video-signal input apparatus for receiving analog component video signals externally on a plurality of input lines, each of said input lines receiving one of said component video signals, said video-signal input apparatus comprising:

a processor operable to generate a switching pattern, based on a predetermined algorithm, defining a pattern of switching for at least two of said analog component video signals between at least two of said input lines;

a switch in communication with terminals of said input apparatus designated for receiving said at least two analog component video signals and operable for switching said terminals, based on said switching pattern, between said at least two input lines in order to continuously transmit the same one of said two analog component video signals to the same one of said terminals; and a controller operable to synchronize said switching with a horizontal scanning interval of the analog component video signals.

9. A video-signal input apparatus according to claim 8, wherein said processor is adapted to determine said switching pattern based upon information obtained by performing bidirectional communication with a video-signal output apparatus transmitting said analog component video signals to said input apparatus.

10. A video-signal input apparatus according to claim 9, wherein said information is superimposed on one or more of the analog component video signals in a predetermined interval thereof.

11. A video-signal input apparatus according to claim 8, wherein said controller controls said switch to execute the switching in response to timing information transmitted to said controller in a horizontal blanking period of the analog component video signals.

12. A video-signal output apparatus as in claim 8, wherein said controller is operable to synchronize said switching in response to a natural-number multiple of said horizontal scanning interval.

13. A video-signal output apparatus as in claim 8, wherein said analog component video signals comprise a luminance signal and two color-difference signals.

14. A video-signal output apparatus as in claim 8, wherein said analog component video signals comprise a red signal, a green signal and a blue signal.

15. A method of receiving analog component video signals on a plurality of input lines, each of said input lines receiving one of said component video signals, comprising:

generating a switching pattern, based on a predetermined algorithm, defining a pattern of switching for at least two of said analog component video signals between at least two of said input lines;

switching, based on said switching pattern, terminals designated for receiving said at least two analog component video signals between said at least two input lines in order to continuously transmit the same one of said two analog component video signals to the same one of said terminals; and synchronizing said switching with a horizontal scanning interval of the analog component video signals.

16. The method of claim 15, further comprising:

determining said switching pattern based upon information obtained by performing bidirectional communication with a video-signal output apparatus transmitting said analog component video signals.

17. The method of claim 16, further comprising:

superimposing said information on one or more of the analog component video signals in a predetermined interval thereof.

18. The method of claim 15, further comprising executing said switching in response to timing information transmitted in a horizontal blanking period of the analog component video signals.

19. A method as in claim 15, further comprising synchronizing said switching in response to a natural-number multiple of said horizontal scanning interval.

20. A method as in claim 15, wherein said analog component video signals comprise a luminance signal and two color-difference signals.

21. A method as in claim 15, wherein said analog component video signals comprise a red signal, a green signal and a blue signal.

22. A method of outputting analog component video signals on a plurality of output lines, each of said output lines outputting one of said component video signals, comprising:

generating a switching pattern based on a predetermined algorithm;

switching, based on said switching pattern, the component video signal previously outputted on a first of said output lines to a second of said output lines and the component video signal previously outputted on the second of said output lines to the first of said output lines; and synchronizing said switching with a horizontal scanning interval of the analog component video signals.

23. The method of claim 22, further comprising:

determining said switching pattern based upon information obtained by performing bidirectional communication with a video-signal input apparatus receiving said analog component video signals.

24. The method of claim 23, further comprising:

superimposing said information on one or more of the analog component video signals in a predetermined interval thereof.

25. The method of claim 22, further comprising executing said switching in response to timing information transmitted in a horizontal blanking period of the analog component video signals.

26. A method as in claim 22, further comprising synchronizing said switching in response to a natural-number multiple of said horizontal scanning interval.

27. A method as in claim 22, wherein said analog component video signals comprise a luminance signal and two color-difference signals.

28. A method as in claim 22, wherein said analog component video signals comprise a red signal, a green signal and a blue signal.

* * * * *